United States Patent [19]

Kozlovsky et al.

[11] Patent Number: 4,764,933
[45] Date of Patent: Aug. 16, 1988

[54] DIODE PUMPED LOW DOPED ND$_{3+}$ GLASS LASER

[75] Inventors: William J. Kozlovsky, Los Altos; Tso Yee; Robert L. Byer, both of Stanford, all of Calif.

[73] Assignee: Stanford University, Stanford, Calif.

[21] Appl. No.: 924,881

[22] Filed: Oct. 30, 1986

Related U.S. Application Data

[63] Continuation-in-part of Ser. No. 896,865, Aug. 15, 1986, Pat. No. 4,739,507, which is a continuation-in-part of Ser. No. 674,948, Nov. 26, 1984, abandoned.

[51] Int. Cl.$^4$ ............................................. H01S 3/17
[52] U.S. Cl. ........................................ 372/40; 372/66; 372/22; 372/21; 372/75; 372/92
[58] Field of Search ....................... 372/21, 22, 39, 66, 372/71, 75, 94, 40, 92

[56] References Cited

U.S. PATENT DOCUMENTS

| | | | |
|---|---|---|---|
| 3,863,177 | 1/1975 | Damen et al. | 372/75 |
| 4,555,786 | 11/1985 | Byer | 372/71 |
| 4,578,793 | 3/1986 | Kane et al. | 372/94 |

OTHER PUBLICATIONS

Kaminow, et al; "Nd:LiNbO$_3$ Laser"; IEEE Jour. Quant Elect., vol. QE-11, No. 6, p. 306, Jun. 75.

*Primary Examiner*—Léon Scott, Jr.
*Attorney, Agent, or Firm*—Harry E. Aine

[57] ABSTRACT

A semiconductive diode pumped Nd:glass laser is disclosed in which standard low-loss Nd:glass is employed as the gain medium. In some embodiments, miniature optical resonators are employed for resonating the lasant radiation within the gain medium. One or more of the reflectors of the optical resonator are preferably defined by one or more faces of the glass gain medium. Travelling wave, Q-switched, modelocked, second harmonic generating, and slab laser embodiments are disclosed.

16 Claims, 1 Drawing Sheet

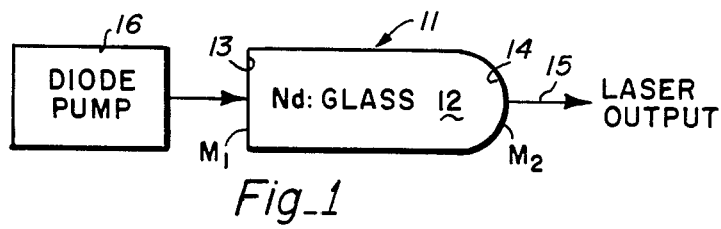
Fig_1
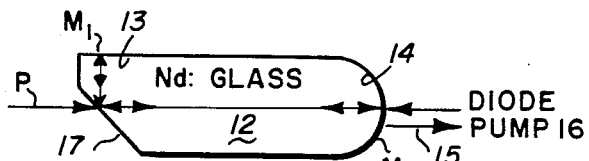
Fig_2
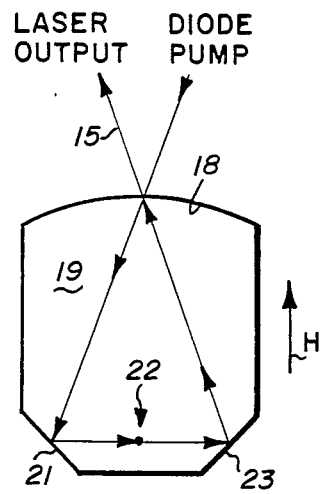
Fig_3
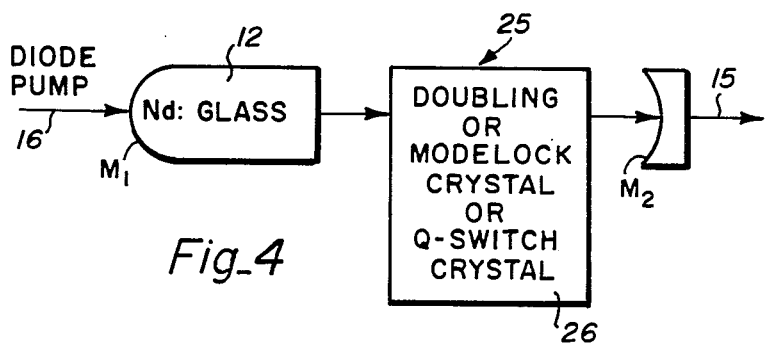
Fig_4
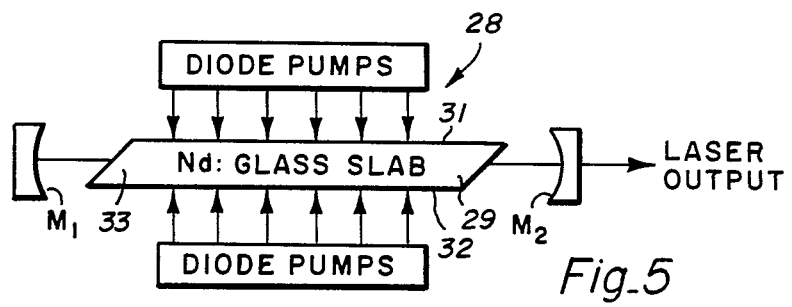
Fig_5
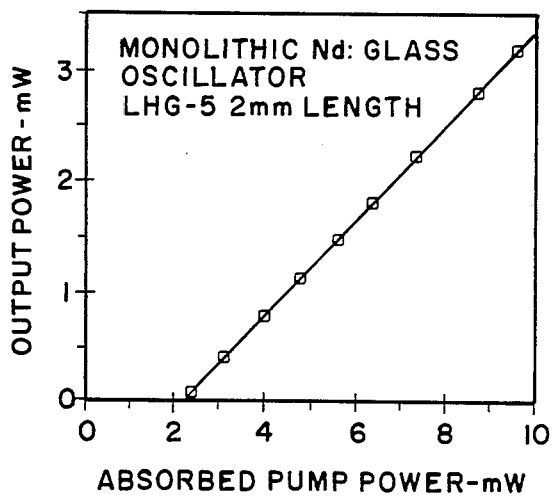
Fig_6

DIODE PUMPED LOW DOPED ND$_{3+}$ GLASS LASER

GOVERNMENT CONTRACT

The present invention was made in connection with the following U.S. Government contracts: National Aeronautic & Space Administration Grant NAG 1-182 and Office of Naval Research Contract N00014-83-K-0449 and the Government has certain rights therein.

RELATED CASES

The present invention is a continuation-in-part invention of U.S. Ser. No. 896,865 filed Aug. 15, 1986 now issued as U.S. Pat. No. 4,739,507 on Apr. 19, 1988, which in turn is a continuation-in-part application of parent application U.S. Ser. No. 674,948 filed Nov. 26, 1984, now abandoned.

BACKGROUND OF THE INVENTION

The present invention relates in general to diode pumped Nd:glass lasers and, more particularly, to such lasers wherein the glass is doped to a relatively low concentration and the resonant radiation is focused within the gain medium by means of a concave focusing element.

DESCRIPTION OF THE PRIOR ART

Heretofore, semiconductor diode pumped Nd$^{3+}$ doped glass lasers have been fabricated wherein the gain medium was formed into a glass fiber with optical resonator mirrors formed on opposite ends thereof. In the glass fiber geometry, the pump and resonant lasant radiation is confined to the core portion of the fiber by means of a graded refractive index cladding on the glass fiber. The fiber geometry is very efficient due to the confinement of the pump and resonant lasant energy to a very small core region of the fiber and due to the fact that the fiber can be relatively long. Such a neodymium glass fiber laser is disclosed in an article appearing in Applied Optics, Vol. 13, No. 6 of June 1974, pgs. 1256–1258.

Some of the problems associated with the glass fiber laser include the fact that it is difficult to efficiently couple pump energy into or resonant energy out of the fiber due to the very small mode sizes, i.e., a cross-sectional area to which the signal and pump waves are confined. Also, feedback into the laser diode causes stability problems. In addition, the fiber dispersion limits modelocked pulse lengths, when modelock pulsing, due to the relatively long fiber lengths used.

It is also known from the prior art to heavily (intrinsically) dope a glass laser gain medium with Nd$^{3+}$ ions by glassifying a Nd pentaphosphate crystal to a concentration greater than $10 \times 10^{20}$ cm$^{-3}$ so as to raise its laser gain cross-section sufficiently to permit lasing with side pumping by light-emitting diodes. The Nd:glass rod in this case had dimensions of $0.5 \times 1 \times 20$ mm and was placed in an almost concentric concave, optical resonator formed by spherical mirrors of $R = 150$ mm. such a Nd:glass laser is disclosed in an article appearing in the Soviet Journal of Quantum Electronics, 10(9), of September 1980, pgs. 1167–1168 and Soviet Journal of Quantum Electronics 11(3) of March 1981, pgs. 289–297.

Some of the problems associated with such a highly doped Nd:glass laser are that the heavily doped glass is a specialty glass which is not readily commercially available and is generally of poor optical quality. Such glasses have increased scattering losses, $>0.2$, with attendant reduced efficiency and increased lasing threshold when contrasted with less heavily doped standard, commercially available Nd$^{3+}$ doped glasses having lower laser gain cross-sections.

It would be desirable to obtain laser action with the less heavily doped standard Nd$^{3+}$ doped glasses efficiently pumped by one or more semiconductor diodes in a concave optical resonator configuration.

SUMMARY OF THE PRESENT INVENTION

The principal object of the present invention is the provision of an improved diode pumped Nd$^{3+}$ glass laser and, more particularly, to such a laser having a relatively low dopant concentration and a concave, optical resonator.

In one feature of the present invention, a semiconductor diode pumped Nd$^{3+}$ laser gain medium is doped to a concentration of Nd$^{3+}$ ions of less than $10 \times 10^{20}$ cm$^{-3}$ and has a loss at the lasant wavelength of less than 0.2 per meter and a gain cross-section of less than $8 \times 10^{-20}$ cm$^2$ with the gain medium being disposed in an optical resonator having at least one concave reflector serving as the dominant focusing mechanism, whereby an inexpensive and efficient laser is obtained.

In another feature of the present invention, the optical pumping radiation is directed generally collinearly of the beam path of the resonated lasant radiation, whereby the efficiency of the laser is increased in use.

In another feature of the present invention, the optical pumping radiation, derived from the semiconductor diode source, is coherent radiation, whereby pumping efficiency is increased in use.

In another feature of the present invention, at least one of the reflectors of the optical resonator is defined by a face of the laser gain medium, whereby the optical resonator configuration is simplified and resonator losses decreased.

In another feature of the present invention, a nonlinear optical material is incorporated within the optical resonator for interaction with the resonated lasant radiation for generating harmonically related radiation.

In another feature of the present invention, an electro-optic or acoustic-optic pulser is incorporated within the optical resonator and pulsed to obtain modelocked or Q-switched pulses of lasant radiation.

In another feature of the present invention, the laser gain medium has a slab configuration with a pair of opposed, broad side faces between which the lasant radiation is reflected in a zig-zag path and wherein the optical pumping radiation is directed into the slab through at least one of said broad faces.

Other features and advantages of the present invention will become apparent upon a perusal of the following specification taken in connection with the accompanying drawings wherein:

BRIEF DESCRIPTION OF THE DRAWINGS

FIG. 1 is a schematic, line diagram, partly in block diagram form of a laser incorporating features of the present invention, FIG. 2 is a view similar to that of FIG. 1 depicting an alternative optical resonator configuration for the laser of FIG. 1, FIG. 3 is a schematic, line diagram depicting an alternative optical resonator and laser gain medium for the laser of FIG. 1, FIG. 4 is a schematic line diagram of a laser system employing second harmonic generation Q-switch modulation or modelock operation, FIG. 5 is a schematic, line diagram of a slap laser incorporating features of the present invention, and FIG. 6 is a plot of output power in mW vs. absorbed pump power in mW for the laser of FIG. 1.

DESCRIPTION OF THE PREFERRED EMBODIMENTS

Referring now to FIG. 1, there is shown a Nd:glass laser 11 incorporating features of the present invention. The laser 11 includes a neodymium doped glass rod 12 having a flat pumping face 13 and a concave output face 14, both faces 13 and 14 are polished. The flat end 13 is coated with a mirror $M_1$ that is highly reflecting for 1.053 μm and highly transmitting at an wavelength of 802 nm. The curved face 14 is coated with a 99.6% reflector at 1.053 μm forming the output mirror $M_2$ and serving as an output coupler for coupling out the lasant radiation as output beam 15.

The laser gain medium 12 is optically pumped with the output beam of a semiconductor laser diode 16 at a wavelength of approximately 802 nm.

In a typical example, the rod 12 of Nd:glass lasant material has a length of 2 mm and a diameter of 2 mm and is cut from LGH-5 Glass, as provided by Hoya Optics, Inc. of Fremont, CA. The output mirror $M_2$ has a curvature of 1.8 cm. The resonator beam waist is 35 μm.

The diode laser light is focused to a spot size of approximately 30 μm by 45 μm. The diode pump laser 16 is a single stripe index-guided GaAlAs diode laser providing 15 mW of radiation at 809 nm at room temperature. Cooling of the diode laser 16 gives a wavelength of 801.5 nm at low diode powers and 803 nm at full power. Laser diodes of this type provide pumping radiation within the band of 780 to 830 nm.

FIG. 6 shows the measured output power of the diode laser pumped monolithic Nd:glass laser oscillator 11. The output power is plotted vs. absorbed pump power and 92% of the pumping light incident on the laser road 12 is absorbed. The laser operated $TEM_{00}$ and had output from both ends of the laser rod 12, with 20% of the power from the highly reflective flat face 13. The laser 11 had a lasing threshold of 2.2 mW and a slope efficiency of 42%. The observed slope efficiency is further improved by tighter diode focusing to insure better pumping into the mode volume. At the maximum diode laser output power of 15 mW, the glass laser output 15 was 3.2 mW, yielding an electrical overall efficiency of 3%. This efficiency, which is the highest reported to date on a cw Nd:glass laser 11, was limited by the relatively low, 11%, efficiency of the diode laser pump 16 and by the 70% transmission efficiency of the diode laser pump focusing optics.

Under dye laser pumping, the monolithic Nd:glass laser oscillator 11 operated at 2.5 mW threshold and 43% slope efficiency. The measured slope efficiency and relaxation oscillation measurements indicated that the total losses for this resonator were 0.65%. At 15 mW cw output, the laser 11 showed no saturation nor thermal problems. The output power was distributed, in many, i.e., greater than 20 axial modes.

The equations that determine performance of the laser pumped laser system 11 of FIG. 1 are shown below in Equations (1) and (2).

For an end pumped laser, the threshold is given by:

$$P_{th} = \frac{h\nu_p \delta}{2\sigma\tau} \frac{\pi}{2} (\overline{w_0^2} + \overline{w_p^2}) \qquad \text{Eq. (1)}$$

with a slope efficiency $$\eta_s = \frac{P_{out}}{P_{abs} \cdot P_{th}} = f_p \frac{T}{\delta} \frac{h\nu_0}{h\nu_p} \qquad \text{Eq. (2)}$$

where h is Planks constant, $\nu_p$ is the pump frequency, $\delta$ is the round-trip cavity loss, $\sigma$ is the net gain cross-section, and $\tau$ is the fluorescent lifetime. $w_0$ and $w_p$ are the signal and pump spot sizes, averaged along the length of the crystal. Here $f_p$ is the fraction of pump power absorbed in the active region, T is the transmission losses of the resonator, and $\nu_0$ is the laser frequency. It is important to note that the slope efficiency $\eta$ is dependent only on the ratio of the transmission loss to the total loss, the quantum defect, and the pump overlap. The pump threshold $P_{th}$ depends on the cavity losses, pump and laser spot sizes, as well as the gain and lifetime of the material. A summary of Nd:glasses and Nd:YAG properties is shown in Table 1, below.

TABLE 1

Properties of Nd:glasses

| Property | Material | | |
|---|---|---|---|
| | LHG-5 | LHG-8 | Nd:YAG |
| Loss (m$^{-1}$) | .123 | .1 | >.2 |
| $\tau_1$ (μs) | 290 | 315 | 255 |
| Bandwidth (nm) | 22.0 | 21.8 | .45 |
| $\sigma$ ($10^{-20}$ cm$^2$) | 4.1 | 4.2 | 33 |
| Nd$_2$O$_3$ (wt %) | 3.8 | 3.0 | .73 |
| Nd$^{3+}$ Concentration ($10^{20}$ ions/cm$^3$) | 3.2 | 3.1 | 1.4 |
| dn/dT ($10^{-6}$/°C.) | 0.0 | −5.3 | 7.3 |
| Linear Thermal Expansion ($10^{-6}$/°C.) | 8.6 | 11.2 | ~8 |

Past work on laser pumped Nd:glass has concentrated on either standard size resonators with large mode volumes which have required argon laser pumping, or else on fiber lasers where pump and signal confinement gave very small $w_0$ and $w_p$ and allowed the use of diode laser pumping. In addition, the very high doping of Li—Nd—La and K—Nd—La phosphate glasses has allowed side pumping using large LED arrays due to the strong absorption of the pump radiation.

We have discovered, as exemplified by Equation (1), that the low losses of standard Nd:glasses (<0.2) allow milliwatt threshold operation for miniature, monolithic (one or more mirrors on the gain medium) resonator designs even though the gain cross-section is low (<8×10$_{-20}$ cm$^2$). The strong pump absorption of the lightly doped (Nd$^{3+}$ concentration <10×10$^{20}$ cm$^{-3}$) Nd:glass allows the use of short gain medium lengths, i.e., on the order of one absorption length of the pump radiation which both reduce material losses and allow smaller spot sizes, thus reducing threshold. It should be noted that very low material losses imply that very high slope efficiencies are achieved with low output coupling losses, leading to high overall efficiency for the monolithic Nd:glass oscillator 11.

Referring now to FIG. 2, there is shown an alternative laser oscillator embodiment of the present invention. In this embodiment, the lightly doped neodymium glass rod 12 has its curved face 14 coated to provide the second mirror $M_2$ and to provide an output coupling for extraction of the laser output beam 15. The curved face 14 is also coated so as to provide high transmission of the diode pumping radiation supplied from the laser diode pump 16. A flat face mirror $M_1$ is provided on the side of the laser rod 12 at the other end. The flat face is coated with a material to provide total reflection of the lasant radiation. A third face 7 is cut at an angle to provide total internal reflection of the lasant radiation within the rod 12 and to resonate lasant radiation reflected to mirror $M_1$. As an option, the diode pumping radiation may be fed into the glass rod 12 through face 17 as shown by arrow P.

Referring now to FIG. 3, there is shown a travelling wave resonator of the type disclosed in U.S. Pat. No. 4,578,793 issued Mar. 25, 1986. In this embodiment, the diode pumping radiation is fed into the travelling wave resonator 19 through a concave mirror 18. The lasant radiation is internally reflected from a first face 21 which reflects the lasant radiation out of the plane of the paper to a second face 22 from which the lasant radiation is reflected back into the plane of the paper and then reflected from a third face 23 back to the input mirror 18 where a small fraction is taken out the input face 18 as output laser beam 15 and a preponderance of the radiation is reflected along the optical axis to face 21 to define a ring resonator.

The advantage of the embodiment of FIG. 3 is that the optical ring resonator is monolithic in that all of the reflectors are formed on the faces of the laser gain medium 19. The out-of-plane bounce prevents backward travelling waves from resonating, thereby obtaining a running wave resonator. The running wave resonator eliminates spatial hole burning and facilitates single axial mode operation making such diode pumped Nd:glass lasers useful for applications such as laser gyroscopes and stable, single frequency lasers. The resonator reflective faces are formed either by coatings applied to the neodymium:glass or else total internal reflection is used at the faces to define the resonator. The diode laser pump can be focused through any of the resonator mirrors or faces.

Referring now to FIG. 4, there is shown an alternative laser system 25 incorporating features of the present invention. In this embodiment, the optical resonator is defined by a first mirror $M_1$ coated or otherwise formed on the curved input face of the neodymium glass laser gain medium 12. An external second mirror $M_2$ defines the second mirror of the optical resonator and either a doubling, Q-switching, or modelocking crystal 26 is placed in the optical resonator on the optical axis thereof for either doubling, Q-switching, or modelocking the output of the laser 15. In the case of doubling, the crystal 26 is an optically nonlinear crystal such as MgO:LiNbO$_3$, KTiOPO$_4$ or B—BaB$_2$O$_4$ for nonlinear interaction with the resonant lasant energy within the optical resonator for producing a second harmonic of the lasant energy which is thence coupled out of the laser 25 at output beam 15. In a second case, the crystal 26 is an electro-optic crystal material for Q-switching or modelocking to allow short pulse operation of the laser 25.

Referring now to FIG. 5, there is shown a slab laser embodiment 28 of the present invention. In this embodiment, the laser gain medium 29 has a slab geometry with a pair of mutually opposed, broad faces 31 and 32 and a pair of mutually opposed narrow side faces 33. The end faces of the slab 29 are cut at an angle such that lasant radiation travelling along the optical axis of the optical resonator defined by mirrors $M_1$ and $M_2$ is refracted into the slab in such a manner as to traverse a zig-zag path inbetween the broad faces 31 and 32 and to exit the slab on the optical axis of the optical resonator. Semiconductor diode pumps, preferably laser diode pumps, pump the glass slab 29 through the broad faces 31 and 32 thereof. Slab lasers pumped by flashlamps are disclosed in U.S. Pat. No. 3,633,126 issued Jan. 4, 1972. The diode pumped slab laser 28 has greatly improved efficiency when contrasted with flash-lamp pumped slab lasers.

The advantages of the present invention include efficient and compact diode pumped Nd:glass lasers using standard Nd:glasses with miniature resonator designs.

What is claimed is:

1. In a method for obtaining laser radiation, the steps of:

optically pumping Nd$^{3+}$ lasant ions of a laser gain medium with the output optical radiation of a light emitting semiconductive diode;

said gain medium comprises a glass member doped with the Nd$^{3+}$ lasant ions to a density of less than $10 \times 10^{20}$ cm$^{-3}$ such that the laser gain medium has an optical loss at the wavelength of the lasant transition of less than 0.2 per meter and has a gain cross-section less than $8 \times 10^{-20}$ cm$^2$;

resonating coherent lasant optical readiation emitted by a lasant transition of said optically pumped lasant Nd$^{3+}$ ions of said gain medium within an optical resonator containing said optically pumped gain medium and having at least one concave reflector to obtain output laser radiation; and focusing the resonant lasant radiation within said optical resonator and within said gain medium such that the predominant focusing mechanism for focusing the resonant radiation within said gain medium is focusing from a concave optical focusing element disposed on the optical axis of the optical resonator.

2. The method of claim 1 wherein the step of optically pumping the Nd$^{3+}$ ions of the laser gain medium comprises the steps of directing the optical pumping radiation into the laser gain medium in a direction generally collinearly with the optical axis of the optical resonator.

3. The method of claim 1 wherein the optical pumping radiation is coherent.

4. The method of claim 1 wherein the optical resonator is defined by faces of said laser gain medium.

5. The method of claim 1 including the step of incorporating an optically nonlinear material within said optical resonator for generating optical radiation of a wavelength harmonically related to the wavelength of the lasant transition of the optically pumped Nd$^{3+}$ ions.

6. The method of claim 1 wherein the optical pumping radiation has a substantial proportion of its energy falling within the band of wavelengths from 780 nm to 830 nm.

7. The method of claim 1 wherein the optical pumping radiation is continuous wave.

8. The method of claim 7 including the step of incorporating a pulser selected from the group consisting of electro-optic and acoustic-optic pulsers within said optical resonator and pulsing said pulser to obtain pulses of output laser radiation.

9. The method of claim 1 wherein said laser gain medium is a slab of Nd$^{3+}$ doped glass having a pair of mutually opposed broad side faces between which the resonant lasant radiation is reflected in a zig-zag path, and wherein the optical pumping radiation is directed into the slab through at least one of said broad side faces.

10. In a laser:
  gain medium means comprising a glass member doped with $Nd^{3+}$ lasant ions to a density of less than $5 \times 10^{20}$ cm$^{-3}$ such that said laser gain medium means has an optical loss at the wavelength of the lasant transition of less than 0.2 per meter and has a gain cross-section less than $8 \times 10^{-20}$ cm$^2$;
  optical pumping means for optically pumping the $Nd^{3+}$ lasant ions of said laser gain medium means with the output optical radiation of a light-emitting semiconductor diode;
  optical resonator means for resonating coherent lasant optical radiation emitted by a lasant transition of said optically pumped lasant $Nd^{3+}$ ions of said gain medium means within said optical resonator means containing said optically pumped gain medium means to obtain output laser radiation; and
  focusing means for focusing the resonant lasant radiation within said optical resonator means and within the said gain medium means such that the predominant focusing mechanism for focusing the resonant radiation within said gain medium means is focusing from a concave optical focusing element disposed on the optical axis of the optical resonator means.

11. The laser of claim 10 wherein said optical pumping means includes means for directing the optical pumping radiation into said laser gain medium means in a direction generally collinearly with the optical axis of said optical resonator means.

12. The laser of claim 10 wherein said optical pumping means includes a semiconductor laser diode.

13. The laser of claim 10 wherein said optical resonator means is defined by faces of said laser gain medium means.

14. The laser of claim 10 including:
  nonlinear optic material disposed within said optical resonator means for interaction with said resonant lasant radiation for generating optical radiation of a wavelength harmonically related to the wavelength of the lasant transitions of the optically pumped $Nd^{3+}$ ions.

15. The laser of claim 10 including:
  pulser means selected from the group of electro-optic and acoustic-optic pulsers disposed within said optical resonator means for pulsing operation of the laser to obtain pulses of output laser radiation.

16. The laser of claim 10 wherein said laser gain medium means is a slab of $Nd^{3+}$ ion doped glass having a pair of mutually opposed broad side faces between which the resonant lasant radiation is reflected in a zig-zag path; and
  wherein the optical pumping radiation is directed into said slab through at least one of said broad side faces.

* * * * *